(12) United States Patent
Friman et al.

(10) Patent No.: US 7,577,437 B1
(45) Date of Patent: Aug. 18, 2009

(54) CHANNEL ALLOCATION METHOD AND DEVICE IN MOBILE SYSTEM AND A MOBILE SYSTEM BASE STATION

(75) Inventors: Leif Friman, Järvenpää (FI); Jukka Pietilä, Helsinki (FI)

(73) Assignee: Nokia Corporation, Espoo (FI)

( * ) Notice: Subject to any disclaimer, the term of this patent is extended or adjusted under 35 U.S.C. 154(b) by 909 days.

(21) Appl. No.: 09/592,156

(22) Filed: Jun. 12, 2000

Related U.S. Application Data

(63) Continuation of application No. PCT/FI99/00848, filed on Oct. 13, 1999.

(30) Foreign Application Priority Data

Oct. 15, 1998 (FI) .................................. 982238

(51) Int. Cl.
*H04W 72/00* (2009.01)
(52) U.S. Cl. ...................... 455/450; 455/464; 455/509; 455/560; 455/456.1; 370/329
(58) Field of Classification Search ................ 455/450, 455/451, 452.1, 464, 509, 560, 561, 456.5, 455/52.5, 456; 370/329
See application file for complete search history.

(56) References Cited

U.S. PATENT DOCUMENTS

| | | | | |
|---|---|---|---|---|
| 4,891,806 | A | * | 1/1990 | Farias et al. .................. 370/503 |
| 5,287,544 | A | | 2/1994 | Menich et al. |
| 5,530,945 | A | * | 6/1996 | Chavez et al. ............... 455/411 |
| 5,619,551 | A | * | 4/1997 | Yahagi ........................ 455/445 |
| 5,640,678 | A | * | 6/1997 | Ishikawa et al. ............ 455/449 |
| 5,699,356 | A | | 12/1997 | Beever et al. |
| 5,701,592 | A | * | 12/1997 | Kallin et al. ................. 455/69 |
| 5,887,256 | A | * | 3/1999 | Lu et al. ..................... 455/426.1 |

(Continued)

FOREIGN PATENT DOCUMENTS

FR       EP 0858 235 A1 *   6/1997

(Continued)

OTHER PUBLICATIONS

International Search Report for PCT/FI99/00848.

(Continued)

*Primary Examiner*—Nghi H Ly
(74) *Attorney, Agent, or Firm*—Squire, Sanders & Dempsey L.L.P.

(57) ABSTRACT

The present invention relates to a mobile system, which includes a base station controller and at least a first and a second base station, which comprise switching means for switching transceiver units of the base stations onto a particular channel of a plurality of optional telecommunication channels between the base station controller and the base stations. In order for the telecommunication channels to be utilized efficiently, the base station controller comprises control means, which allocate in connection with call set-up at least one of said telecommunication channels to the first or to the second base station for the duration of the call, and which transmit a predetermined message on the allocated channel to the base station to which the channel is allocated, the switching means of the first and, correspondingly, of the second base stations being responsive to said message for switching the transceiver units to the channel assigned by said message.

15 Claims, 2 Drawing Sheets

U.S. PATENT DOCUMENTS

Figure 1:
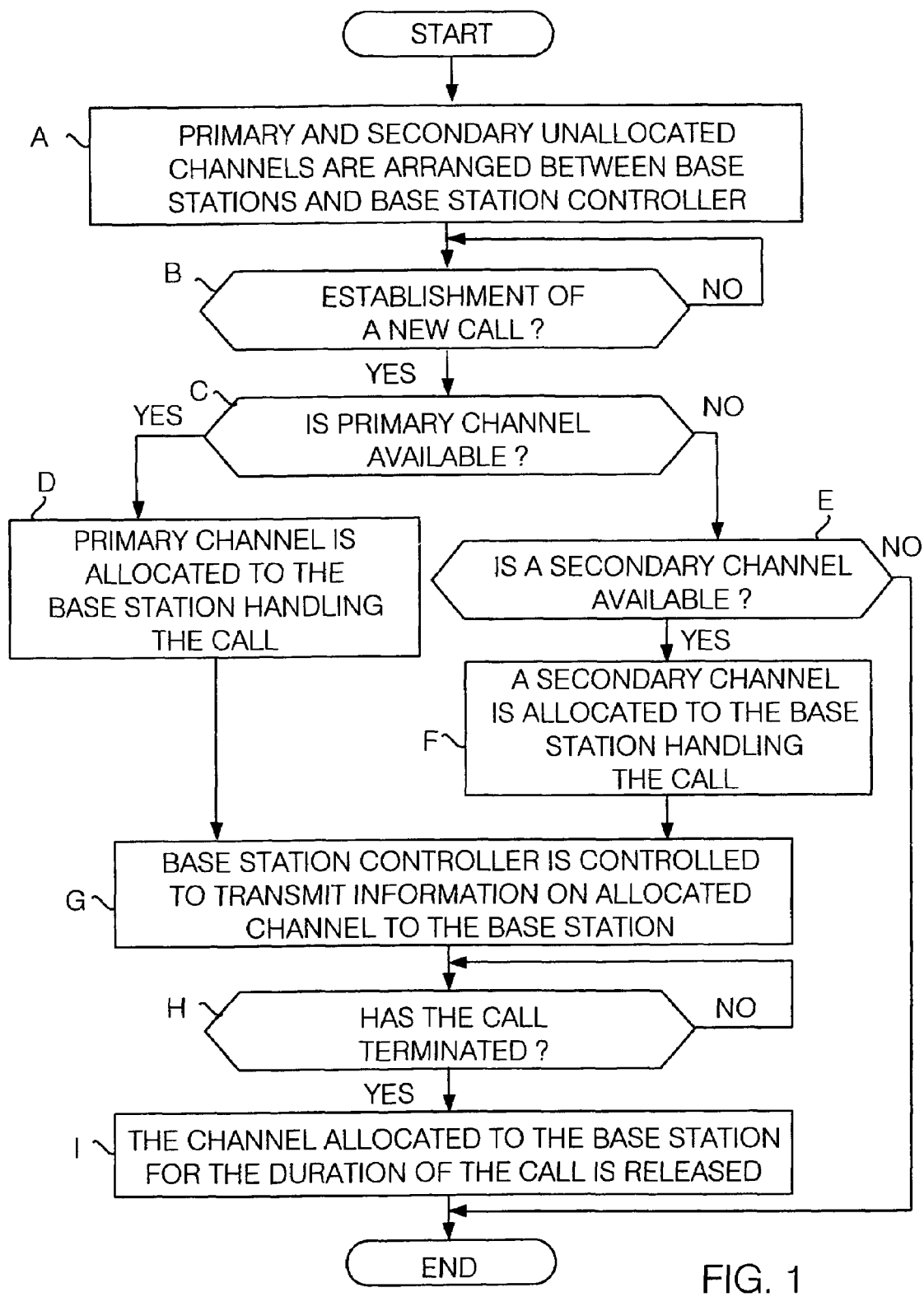

| | | | |
|---|---|---|---|
| 5,930,248 A * | 7/1999 | Langlet et al. | 370/347 |
| 5,940,762 A * | 8/1999 | Lee et al. | 455/442 |
| 5,943,610 A * | 8/1999 | Endo | 455/69 |
| 5,987,326 A * | 11/1999 | Tiedemann et al. | 455/442 |
| 6,138,020 A * | 10/2000 | Galyas et al. | 455/436 |
| 6,188,911 B1 * | 2/2001 | Wallentin et al. | 455/524 |
| 6,195,566 B1 * | 2/2001 | Kanai | 455/562.1 |
| 6,724,740 B1 * | 4/2004 | Choi et al. | 370/335 |

FOREIGN PATENT DOCUMENTS

| | | |
|---|---|---|
| GB | 2 320 652 | 6/1998 |
| JP | 6-260984 | 9/1994 |
| JP | 10-136440 | 5/1996 |
| WO | WO 97/12492 | 4/1997 |
| WO | WO 97/012492 | 4/1997 |
| WO | WO 97/24008 | 7/1997 |

OTHER PUBLICATIONS

Mouly, et. al., "Channel Activation", *The GSM System for Mobile Communications*, 2 pgs. (1992).

* cited by examiner

CHANNEL ALLOCATION METHOD AND DEVICE IN MOBILE SYSTEM AND A MOBILE SYSTEM BASE STATION

This application is a continuation of international application serial number PCT/FI99/00848, filed 13 Oct. 1999.

The present invention relates to channel allocation on a telecommunication connection between a base station and a base station controller of a mobile system. In particular, the invention relates to a mobile system such as GSM (Global System for Mobile communications), in which call-related telecommunication signals are conveyed through circuit-switched telecommunication channels between base stations and a base station controller. In this context a call refers to any traffic connection to be switched in a mobile system, such as a common voice call, or alternatively, a data call, for instance.

For instance, in the GSM system calls are switched over an Abis interface between the base stations and the base station controller on circuit-switched telecommunication channels, which in practice can consist of e.g. time slots of a 2 Mbit/s PCM (Pulse Code Modulation) connection. Then the PCM connection time slots, i.e. the telecommunication channels, are permanently allocated to transceiver units of the base stations. If any one of the transceiver units is not handling a call at a given moment, it means that the PCM time slot allocated to said transceiver unit is not in use.

The most considerable drawback of the above-described known solution is the great number of telecommunication channels needed for the telecommunication connections between the base stations and the base station controllers. Since the existing telecommunication channels are permanently allocated to a specific transceiver unit, the number of necessary telecommunication channels is dependent on the number of the transceiver units. Since the mobile systems are dimensioned, as far as possible, such that almost every base station has all the time idle transceiver units (which can handle new calls, when necessary), it means that a relatively great number of telecommunication channels between the base station controller and the base stations are constantly unused.

The object of the present invention is to solve the above-described problem and to provide a solution by which the degree of utilization of the telecommunication channels between the base stations and the base station controller of the mobile system can be increased to the effect that the existing telecommunication channels could be utilized more efficiently than before and the overdimensioning of the system could be avoided. This is achieved with a channel allocation method in a mobile system in accordance with the invention. The method of the invention is characterized by comprising the steps of arranging in the system unallocated telecommunication channels between a base station controller and a base station, allocated in call set-up at least one of said telecommunication channels to the base station switching the call, and controlling the base station controller to transmit information to the base station on the telecommunication channel allocated thereto.

The invention further relates to a mobile system, to which the method of the invention can be applied and which includes a base station controller and at least a first base station and a second base station which comprise transceiver units for establishing a telecommunication connection by radio signals to the subscriber terminals located in the base station coverage area and switching means for switching the base station transceiver units onto a particular channel of a plurality of optional telecommunication channels between the base station controller and the base stations. The mobile system in accordance with the invention is characterized in that the base station controller comprises control means which in call set-up allocate at least one of said telecommunication channels to the first or the second base station for the duration of the call and which transmit a predetermined message assigning the allocated telecommunication channel to the base station to whom the channel is allocated, and that the switching means of the first and correspondingly of the second base station are responsive to said message for switching the base station transceiver units to the telecommunication channel assigned by said message.

The invention still further relates to a mobile system base station, which can be utilized in the system in accordance with the invention and which comprises transceiver units for establishing a telecommunication connection by radio signals to the subscriber terminals located in its coverage area, and switching means for switching its transceiver units to particular channels of a plurality of optional circuit-switched telecommunication channels. The mobile system in accordance with the invention is characterized in that the switching means are responsive to a message received by the base station in connection with call set-up for switching a particular transceiver unit onto a circuit-switched telecommunication channel assigned by the message for the duration of the call to be established.

The invention is based on the idea that telecommunication channels between the base station and the base station controller can be utilized more efficiently than before, i.e their degree of utilization improves, when the channel allocation is performed call-specifically. Thus a given telecommunication channel is only allocated for the duration of the call to a transceiver unit of the base station handling the call. When the call terminates, the telecommunication channel will be released, whereby it can be freely allocated to another transceiver unit. Said other transceiver unit can be a transceiver unit of the same or some other base station. The same telecommunication channel can thus be allocated call-specifically to various base stations. Hence a pool of free, i.e. unallocated, telecommunication channels is formed between the base stations and the base station controller, from which pool the base station controller allocates a free channel call-specifically to the base station that needs a channel for handling a call at a given moment.

The fact that a particular telecommunication channel can be allocated to a plurality of base stations enables reduction in the number of telecommunication channels. This is due to the fact that it is highly unlikely that all transceiver units of all base stations would simultaneously handle calls. Hence the number of telecommunication channels can be lower than the number of calls that the transceiver units are capable of handling simultaneously via a radio interface. Available telecommunication channels are thus allocated to the transceiver units of those base stations through which a call is going on.

Thus the most considerable advantages of the solution of the invention are that the degree of utilization of available telecommunication channels improves and the number of telecommunication channels between the base stations and the base station controller can be reduced.

In one preferred embodiment of the method of the invention, the telecommunication channels between the base stations and the base station controller are circuit-switched telecommunication channels that are classified on the basis of their characteristics into at least two categories, i.e. primary telecommunication channels and secondary telecommunication channels. In call set-up, a primary telecommunication channel, if available, is thus allocated to the base station, otherwise a free secondary telecommunication channel is allocated thereto. This embodiment in accordance with the invention makes it possible that secondary telecommunication channels can be arranged between the base stations and the base station controller to be used when all primary telecommunication channels are already allocated to a base station. Hence 'congestion' in the system, resulting from all channels between the base station and the base station controller being in use, can be avoided. Classification of telecommunication channels enables the secondary telecommunication channels to have poorer characteristics than the primary ones. Alternatively, the use of secondary telecommunication channels may cause heavier costs than the primary channels to the operator, and therefore it is advisable to use them only exceptionally.

The preferred embodiments of the method, mobile system and base station in accordance with the invention are disclosed in the accompanying dependent claims 2 to 3, 5 to 8 and 10.

Figure 2:
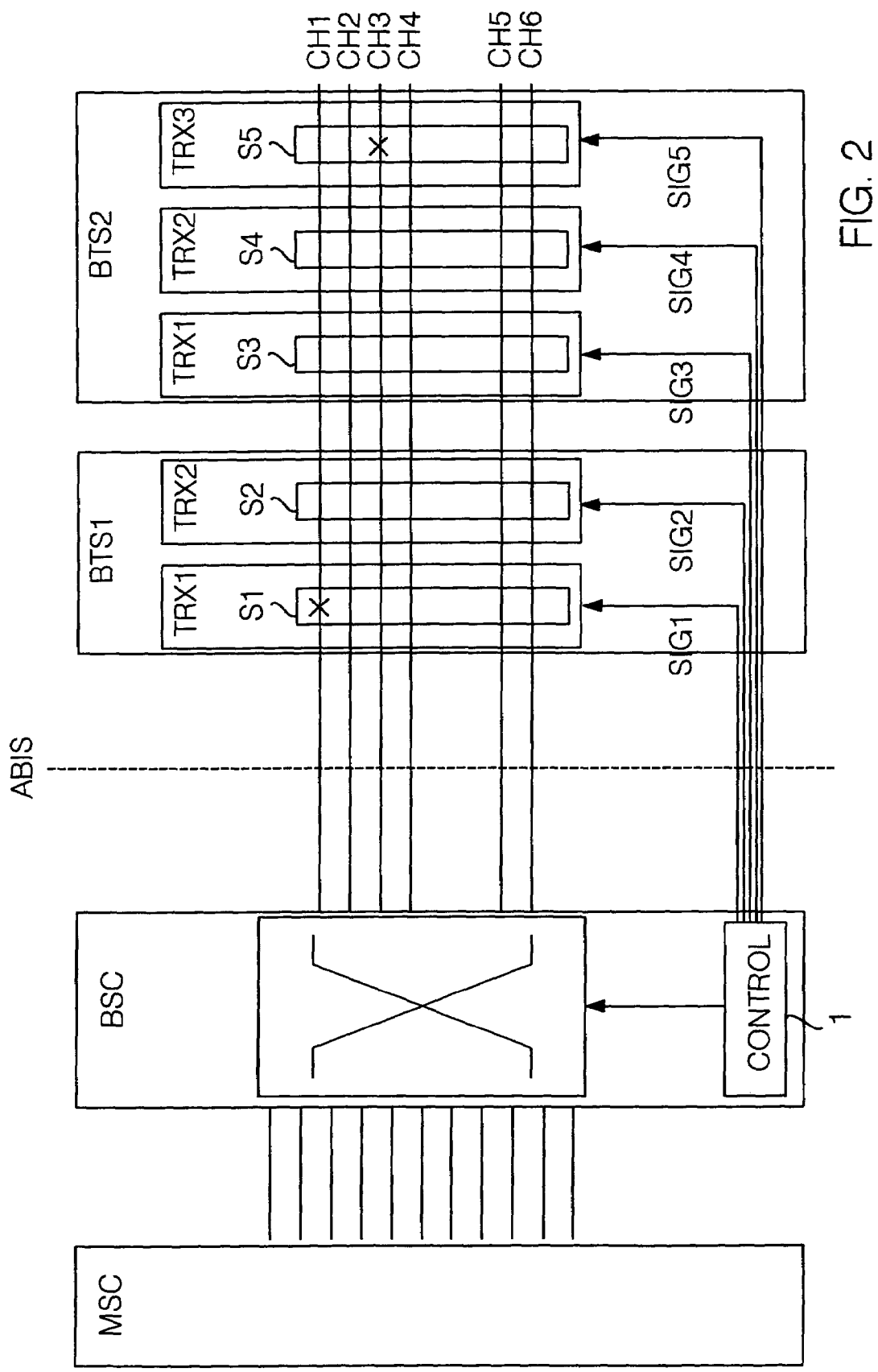

In the following the invention will be described in greater detail by way of example with reference to the attached drawings, wherein FIG. 1 is a flow chart of a first preferred embodiment of the method of the invention, and FIG. 2 is a block diagram of a first preferred embodiment of the mobile system of the invention.

FIG. 1 is a flow chart of a first preferred embodiment of the method in accordance with the invention. The flow chart of FIG. 1 can be utilized in telecommunication channel allocation between base stations and a base station controller in the GSM system, for instance.

In block A, circuit-switched primary and secondary unallocated telecommunication channels are arranged between the base stations and the base station controller, i.e. said telecommunication channels are not permanently allocated to any specific base station or transceiver unit in the base stations. The telecommunication channels are grouped on the basis of their characteristics such that the primary channels are of better quality, have larger data transmission capacity, are more reliable or inexpensive in use than the secondary telecommunication channels. Depending on the implementation, the telecommunication channels can also be grouped into more than two categories.

In block B, it is awaited until call set-up relating to a new call starts. In this context a call refers to any traffic connection to be switched in the system, for instance such as a common voice call, or alternatively, a data call.

In block C, it is checked whether any one of the primary telecommunication channels between the base stations and the base station controller is free. If it then occurs that one of the primary telecommunication channels is free, i.e. at said moment it is not allocated to any base station, said free channel will be allocated in block D to the base station that handles a new call to be established.

Instead, if it appears in block C that all primary telecommunication channels are already allocated at said moment, a transfer to block E is performed. In block E, it is checked whether any one of the secondary telecommunication channels between the base stations and the base station controller is free. If a free, unallocated, secondary channel is found, it will be allocated in block F to the base station that handles a new call to be established.

Instead, if it appears in block E that all secondary telecommunication channels, too, are allocated at said moment, the call set-up fails.

In block G, the base station controller transmits information on the allocated channel to the base station through the transceiver unit of which the call to be established will be handled. For instance in the GSM system, information on the allocated channel can be included in the CHANNEL ACTIVATION message in accordance with the GSM specification part 08.58, by which message the base station controller informs the transceiver unit on the radio channel to be used for the call.

In block H, it is awaited until the call has terminated, whereafter the telecommunication channel allocated to the base station for the duration of the call will be released in block I. Thereafter, if necessary, said channel can be allocated to a transceiver unit of another base station for the duration of a new call to be established.

FIG. 2 shows a first preferred embodiment of the mobile system in accordance with the invention. The mobile system shown in FIG. 2 can be the GSM system, for instance.

A base station controller BSC of FIG. 2 communicates with a mobile services switching centre MSC and with base stations BTS1 to BTS2 in order to switch calls to mobile stations located in the coverage area of the base stations. The base station BTS1 comprises two transceiver units TRX1 to TRX2, whereas the base station BTS2 comprises three transceiver units TRX1 to TRX3. For each transceiver unit in the base stations BTS1 and BTS2, a dedicated signalling channel SIG1 to SIG5 is reserved between the base station controller and the transceiver units. Through said signalling channel a control unit 1 of the base station controller, for instance, conveys information to the transceiver units on the radio channel they should utilize at a given instant of time.

Unlike in FIG. 2, it is not necessary to allocate a dedicated signalling channel to every transceiver unit, but signalling between the base station controller and the transceiver units can also be implemented with one single, shared (e.g. 64 kbit/s) signalling channel. The base station controller and the transceiver units can then add to the messages to be transmitted on the shared signalling channel, for instance, an identifier that indicates for whom the messages are intended. The transceiver units can also perform a so-called random access to the shared signalling channel by using their own identifier in connection with calls originating from mobile stations.

Circuit-switched data transmission channels CH1 to CH6 are also arranged between the base station controller BSC and the base stations, through which channels call-related telecommunication signals are conveyed between the base station controller and the base station transceiver units. The data transmission channels are grouped into primary and secondary data transmission channels on the basis of their characteristics. The primary data transmission channels CH1 to CH4 can be, for instance, time slots of a PCM connection transmitted via cable. The secondary data transmission channels CH5 to CH6 can be, for instance, connections between the base station controller BSC and the base stations conveyed via a satellite link. Hence the use of primary telecommunication channels is cheaper than the use of secondary telecommunication channels for the operator.

The telecommunication channels CH1 to CH6 are not permanently allocated to any base station or any base station transceiver unit. Hence for instance, the telecommunication channel CH1 can be allocated call-specifically to any one of the transceiver units in the base station BTS1 or BTS2. In the case of FIG. 2, the telecommunication channel CH1 is allocated to the transceiver unit TRX1 of the base station BTS1. Correspondingly, the telecommunication channel CH3 in FIG. 2 is allocated to the transceiver unit TRX3 of the base station BTS2. For instance, when the ongoing call through the transceiver unit TRX1 of the base station BTS1 terminates, the channel CH1 will be released, whereby the base station controller BSC can allocate it to some other base station or transceiver unit.

The allocation of the telecommunication channels CH1 to CH6 is performed by a control unit 1 of the base station controller BSC in connection with the call set-up. The control unit 1 allocates the telecommunication channel to that base station through which the call will be switched. The control unit 1 selects the channel to be allocated from a number of free primary telecommunication channels CH1 to CH4. Only, if there is no free primary telecommunication channel, it allocates a secondary telecommunication channel CH5 to CH6.

Having selected the telecommunication channel to be allocated, for instance channel CH4, the control unit 1 transmits information on the allocated channel to the transceiver unit of that base station through which the call to be established is intended to be switched, i.e. for instance, to the transceiver unit TRX2 of the base station BTS1. The control unit transmits this information on the signalling channel SIG2 of the transceiver unit TRX2, for instance in conjunction with the CHANNEL ACTIVATION message in accordance with GSM specifications part 08.58 (by which message a radio channel is assigned to the transceiver unit TRX2).

After receiving the message, which assigns the allocated telecommunication channel CH4, from the signalling channel SIG2, switching means S2 of the transceiver unit TRX2 of the base station BTS1 switch the transceiver unit TRX2 onto said channel. FIG. 2 shows that the switching means of the transceiver unit TRX2 can switch it onto any one of the telecommunication channels CH1 to CH6. When the call is over, the switching means S2 in turn release the channel CH4 used for the call, whereafter the control unit 1 can allocate it to another base station or transceiver unit.

Unlike in FIG. 2, the control unit 1 can allocate more than one telecommunication channels CH1 to CH6 to the transceiver unit of the base station for the duration of the call. In other words, if the capacity of the telecommunication channels CH1 to CH6 is 16 kbit/s, for instance, but the telecommunication resources allocated to the call (e.g. a data call) are on a radio path of 64 kbit/s, the control unit can simultaneously allocate four channels of 16 kbit/s CH1 to CH4 to the transceiver unit of the base station in order to provide the same data transmission capacity over the ABIS interface as on the radio path. A further advantage of not needing to overdimension the telecommunication channels CH1 to CH6 is achieved by this kind of dynamic allocation of telecommunication channels CH1 to CH6. In other words, since only some of the calls need extended data transmission capacity at the ABIS interface, it is unnecessary to design individual telecommunication channels to meet the highest imaginable need (e.g. 64 kbit/s), whereby only part of their capacity would be in use during normal calls. The capacity of the telecommunication channels is utilized more efficiently by the above-described dynamic allocation, in which a required number of channels are allocated at any given time.

It is to be understood that the above description and the figures relating thereto are only intended to illustrate the present invention. It is obvious to the person skilled in the art that the invention can be varied and modified in a variety of ways without deviating from the scope and spirit of the invention disclosed in the accompanying claims.

The invention claimed is:

1. A method comprising:
arranging, in a mobile system between a base station controller and base stations, telecommunication channels which are available for a plurality of base stations but not permanently allocated to any base station, classifying said arranged telecommunication channels on the basis of their characteristics into at least two categories including primary telecommunication channels and secondary telecommunication channels, allocating in call set-up at least one of said primary telecommunication channels between the base station controller and the base stations to the base station handling the call if available, and otherwise allocating in call set-up at least one of said secondary telecommunication channels between the base station controller and the base stations to the base station handling the call, and controlling the base station controller to transmit information to the base station to indicate for the base station the telecommunication channel between the base station controller and the base station allocated thereto.

2. A method as claimed in claim 1, wherein said telecommunication channels are circuit-switched.

3. A method as claimed in claim 1, wherein said telecommunication channels are classified into categories on the basis of their data transmission capacity or quality such that the primary telecommunication channels have larger data transmission capacity or they are of better quality than the secondary telecommunication channels.

4. A system, comprising:
a base station controller,
a plurality of optional telecommunication channels, which are not permanently allocated to any base station, available between said base station controller and base stations, said optional telecommunication channels being classified on the basis of their characteristics into at least two categories including primary telecommunication channels and secondary telecommunication channels, at least a first and a second base station, which comprise transceiver units configured to establish a telecommunication connection by radio signals to the subscriber terminals located in the base station coverage area and a switching unit configured to switch the base station transceiver units onto a particular channel of said plurality of optional telecommunication channels between the base station controller and the base stations, the base station controller comprises a controller which in call set-up allocates at least one of said primary telecommunication channels between said base station controller and said base stations to the first or the second base station for the call if available, and otherwise allocates at least one of said secondary telecommunication channels between the base station controller and the first or second base station for the call and which transmit a predetermined message indicating the allocated telecommunication channel to the base station to whom the channel is allocated, and the switching unit of the first, and correspondingly, of the second base station are responsive to said message for switching the base station transceiver units to the telecommunication channel assigned by said message.

5. A system as claimed in claim 4, wherein said telecommunication channels are circuit-switched telecommunication channels.

6. A system as claimed in claim 4, wherein the primary telecommunication channels have larger data transmission capacity or they are of better quality than the secondary telecommunication channels.

7. A system as claimed in claim 4, wherein said message indicating the allocated telecommunication channel also indicates a radio channel to be used in the call to the transceiver unit of the base station.

8. A system as claimed in claim 4, wherein said system is a global system for mobile communications (GSM) system and said message consists of a CHANNEL ACTIVATION message in accordance with the GSM specifications part 08.58, to which is added information on the telecommunication channel allocated to the base station.

9. An apparatus, comprising:
transceiver units configured to establish a telecommunication connection by radio signals to subscriber terminals located in a coverage area of the apparatus, and
a switching unit configured to connect the transceiver units in call set-up to a base station controller via particular channels of a plurality of optional telecommunication channels which are classified on the basis of their characteristics into at least two categories which are classified on the basis of their characteristics into at least two categories including primary telecommunication channels and secondary telecommunication channels, and which are available between said base station controller and base stations of said system and which are not permanently allocated to any base station, said switching unit being responsive to a message received by the apparatus in conjunction with the call set-up for switching a particular transceiver unit onto the telecommunication channel between the base station controller and the apparatus indicated by the message for the call, said telecommunication channel being a primary telecommunication channel, if available, other wise a free secondary telecommunication channel.

10. An apparatus as claimed in claim 9, wherein said particular transceiver unit comprises an applying unit configured to apply a radio channel assigned by the message for the duration of the call to be established.

11. An apparatus comprising:
means for a base station controller for communicating with base stations via a plurality of optional telecommunication channels, which are classified on the basis of their characteristics into at least two categories including primary telecommunication channels and secondary telecommunication channels, and which are not permanently allocated to any base station, between the apparatus and the base stations, and
control means for a base station controller for allocating in call set-up at least one of said primary telecommunication channels between the apparatus and the base stations to a base station for a call if available, and otherwise for allocating at least one of said secondary telecommunication channels between the apparatus and the base stations for the call, and for transmitting a predetermined message indicating the allocated telecommunication channel to the base station to whom the channel is allocated.

12. An apparatus comprising:
a communicating unit for a base station controller configured to communicate with base stations via a plurality of optional telecommunication channels, which are classified on the basis of their characteristics into at least two categories including primary telecommunication channels and secondary telecommunication channels, and which are not permanently allocated to any base station, between the apparatus and the base stations, and
a controller for a base station controller configured to allocate in call set-up at least one of said primary telecommunication channels between the apparatus and the base station to a base station for a call if available, and otherwise for allocating at least one of said secondary telecommunication channels between the apparatus and the base station to a base station for a call and to transmit a predetermined message indicating the allocated telecommunication channel to the base stations to whom the channel is allocated.

13. A system comprising:
base stations and telecommunication channels which are classified on the basis of their characteristics into at least two categories including primary telecommunication channels and the secondary telecommunication channels, and which are available for a plurality of base stations but not permanently allocated to any base station, between a base station controller and the base stations,
allocating means for allocating in call set-up at least one of said primary telecommunication channels between the base station controller and the base stations to the base station handling the call if available, and otherwise for allocating in call set-up at least one of said secondary telecommunication channels between the base station controller and the base stations to the base station handling the call, and
controlling means for controlling the base station controller to transmit information to the base station to indicate for the base station the telecommunication channel between the base station controller and the base stations allocated thereto.

14. An apparatus comprising:
transceiver means for establishing a telecommunication connection by radio signals to subscriber terminals located in a coverage area of the apparatus, and
switching means for connecting the transceiver means in call set-up to a base station controller via particular channels of a plurality of optional telecommunication channels available between said base station controller and base stations of said system and which are classified on the basis of their characteristics into at least two categories including primary telecommunication channels and secondary telecommunication channels and not permanently allocated to any base station, said switching means being responsive to a message received by the apparatus in conjunction with the call set-up for switching a particular transceiver means onto the telecommunication channel between the base station controller and the apparatus indicated by the message for the call, said telecommunication channel being a primary telecommunication channel, if available, otherwise a free secondary telecommunication channel.

15. An apparatus as claimed in claim 9, wherein said telecommunication channels are classified into categories on the basis of their data transmission capacity or quality such that the primary telecommunication channels have larger data transmission capacity or they are of better quality than the secondary telecommunication channels.

* * * * *